(12) United States Patent
Lakkundi et al.

(10) Patent No.: US 11,429,382 B1
(45) Date of Patent: Aug. 30, 2022

(54) REGRESSION TEST CASE IDENTIFICATION FOR TESTING SOFTWARE APPLICATIONS

(71) Applicant: KYNDRYL, INC., New York, NY (US)

(72) Inventors: Abdul Kareem A Lakkundi, Gadag (IN); Rajesh Ganji, Bengaluru (IN); Abdul Karimulla Shakhadari Mohammed, Kovvur (IN); Ashutosh Janoria, Bangalore (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/398,502

(22) Filed: Aug. 10, 2021

(51) Int. Cl.
| | |
|---|---|
| *G06F 9/44* | (2018.01) |
| *G06F 8/75* | (2018.01) |
| *G06F 8/73* | (2018.01) |
| *G06F 11/36* | (2006.01) |
| *G06N 20/20* | (2019.01) |
| *G06F 8/74* | (2018.01) |

(52) U.S. Cl.
CPC .............. *G06F 8/75* (2013.01); *G06F 8/73* (2013.01); *G06F 8/74* (2013.01); *G06F 11/3684* (2013.01); *G06N 20/20* (2019.01); *G06F 11/3696* (2013.01)

(58) Field of Classification Search
None
See application file for complete search history.

(56) References Cited

U.S. PATENT DOCUMENTS

| | | | |
|---|---|---|---|
| 5,694,540 A | 12/1997 | Humelsine et al. | |
| 6,192,108 B1 | 2/2001 | Mumford et al. | |
| 6,415,396 B1 * | 7/2002 | Singh | G06F 11/3688 714/33 |
| 7,178,063 B1 * | 2/2007 | Smith | G06F 11/3688 717/124 |
| 10,956,308 B2 * | 3/2021 | Liemandt | G06F 11/3672 |
| 2016/0062876 A1 * | 3/2016 | Narayanan | G06F 11/3684 717/124 |
| 2016/0117239 A1 * | 4/2016 | Hamilton, II | G06F 11/3684 717/124 |
| 2017/0046245 A1 * | 2/2017 | Liu | G06F 11/3688 |
| 2020/0019493 A1 * | 1/2020 | Ramakrishna | G06F 11/3688 |

FOREIGN PATENT DOCUMENTS

| | | |
|---|---|---|
| CN | 112328471 A | 2/2021 |
| WO | 2021050065 A1 | 3/2021 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

*Primary Examiner* — Qamrun Nahar
(74) *Attorney, Agent, or Firm* — Erik Swanson; Matthew M. Hulihan; Heslin Rothenberg Farley & Mesiti PC

(57) ABSTRACT

Regression test case identification for automated regression testing includes identifying program code file(s) in which changes made to program code of an application are contained, selecting application feature(s) of the application as candidate(s) on which to perform automated regression testing, which selecting includes accessing mappings indicating features implemented by the identified program code files and identifying those features as the selected application feature(s), based on the selected application feature(s), selecting regression test cases to be included in the automated regression testing, and commencing execution of the automated regression testing using the selected regression test cases.

20 Claims, 8 Drawing Sheets

REGRESSION TEST CASE IDENTIFICATION FOR TESTING SOFTWARE APPLICATIONS

BACKGROUND

Software applications are often composed of multiple different functional layers in which features of the applications are implemented. Example functional layers are a User Interface (UI) layer, a Business Logic (BL) layer, and a Data Access (DA) layer. The UI layer presents the 'face' of the application to users. This layer typically sees the most changes over time as compared to other layers because changes desired by the consumer of the application (usually a business) often dictate that UI changes be made. The BL layer (BLL) incorporates the 'business logic' to perform the key functions of the product, for instance to address a problem that the application is developed to address. The BLL is often where the key features reside and are updated over time. The BLL, like the UI layer, can also undergo frequent updates based on the market, competition, and other factors that drive the business/consumer of the application. The DA layer is driven primarily by the UI and BL layers. Data access is commonly performed by application programming interfaces (APIs) or other entities programmed as part of the application to access data from a backend and communicate data between the backend and the UI/BL layers. Changes to code of the DA layer are usually orchestrated by the UI and BL layers.

Regression testing is commonly implemented after program code of an application undergoes changes. Regression testing tests the application to ensure that the changes have not caused a regression of the application, i.e., to ensure that the developed aspects of the application previously tested continue to perform properly after the changes.

SUMMARY

Shortcomings of the prior art are overcome and additional advantages are provided through the provision of a computer-implemented method. The method includes, based on changes made to program code of an application, the program code of the application being included in program code files and implementing application features of the application, automatically identifying at least one program code file, of the program code files, in which the changes are contained. The method automatically selects at least one application feature, of the application features, as at least one candidate on which to perform automated regression testing. The automatically selecting includes electronically accessing data structure(s) that include mappings between the program code files and the application features, the mappings indicating, for each program code file of the program code files, which of the application features are at least partially implemented by the program code included in that program code file, and performing a lookup in the accessed data structure(s) and identifying, as the selected at least one application feature, each application feature that is at least partially implemented by program code included in any of the identified at least one program code file. Based on the selected at least one application feature, the method selects, from regression test cases defined for the application features, regression test cases to be included in the automated regression testing. The method also commences execution of the automated regression testing using the selected regression test cases.

Further, a computer system is provided that includes a memory and a processor in communication with the memory, wherein the computer system is configured to perform a method. The method includes, based on changes made to program code of an application, the program code of the application being included in program code files and implementing application features of the application, automatically identifying at least one program code file, of the program code files, in which the changes are contained. The method automatically selects at least one application feature, of the application features, as at least one candidate on which to perform automated regression testing. The automatically selecting includes electronically accessing data structure(s) that include mappings between the program code files and the application features, the mappings indicating, for each program code file of the program code files, which of the application features are at least partially implemented by the program code included in that program code file, and performing a lookup in the accessed data structure(s) and identifying, as the selected at least one application feature, each application feature that is at least partially implemented by program code included in any of the identified at least one program code file. Based on the selected at least one application feature, the method selects, from regression test cases defined for the application features, regression test cases to be included in the automated regression testing. The method also commences execution of the automated regression testing using the selected regression test cases.

Yet further, a computer program product including a computer readable storage medium readable by a processing circuit and storing instructions for execution by the processing circuit is provided for performing a method. The method includes, based on changes made to program code of an application, the program code of the application being included in program code files and implementing application features of the application, automatically identifying at least one program code file, of the program code files, in which the changes are contained. The method automatically selects at least one application feature, of the application features, as at least one candidate on which to perform automated regression testing. The automatically selecting includes electronically accessing data structure(s) that include mappings between the program code files and the application features, the mappings indicating, for each program code file of the program code files, which of the application features are at least partially implemented by the program code included in that program code file, and performing a lookup in the accessed data structure(s) and identifying, as the selected at least one application feature, each application feature that is at least partially implemented by program code included in any of the identified at least one program code file. Based on the selected at least one application feature, the method selects, from regression test cases defined for the application features, regression test cases to be included in the automated regression testing. The method also commences execution of the automated regression testing using the selected regression test cases.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
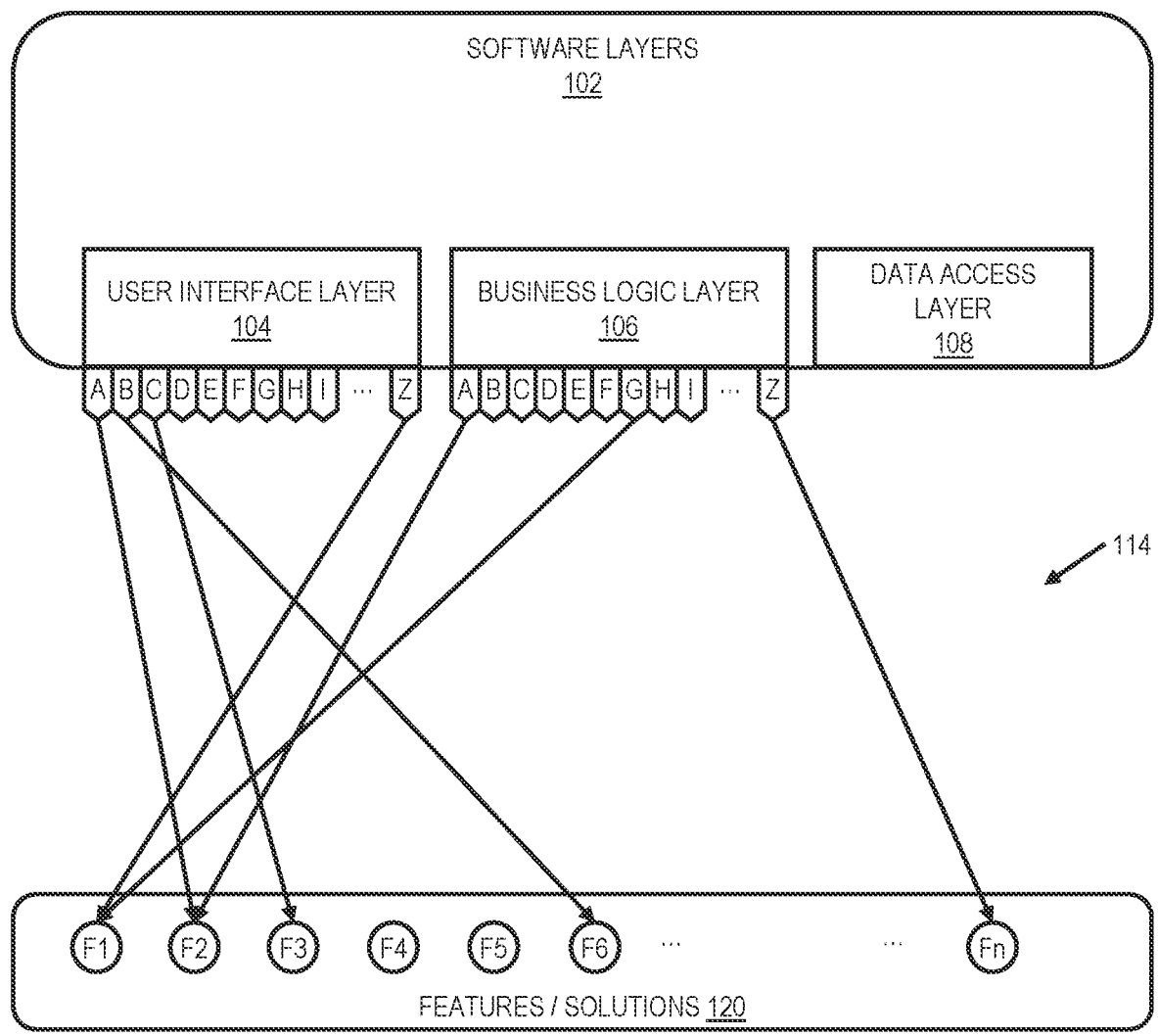
FIG. 1 depicts a conceptual diagram of a file-feature map, in accordance with aspects described herein.

As noted, software applications are often multi-layered in terms of function performance and program features. Each layer could be distinct from the other, having its role defined and restricted in terms of boundaries on its functions. An application's functional layers implement features of the application and application feature(s) may be implemented across such layers, for instance in a situation where an application feature is implemented by code of a BL layer and code of a DA layer, as one example. In this manner, despite the layers being distinct and potentially being based on different technologies, they work in tandem to make the features/solutions of the application work. The program code constituting the application is included in program code files, and different sets of the program code files include program code that implement different functional layers of the multiple functional layers making up the application.

In an application with a multi-layered architecture and that typically involves an amalgamation of different technologies, it can be difficult to identify the regression test cases to use for regression testing after program code of the application goes through changes. When the product grows exponentially in terms of features and codebase, the complexity of identifying the regression test cases increases. Different developers changing different program code portions at different times and different test cases applying to different portions of the program code renders the task of identifying the most efficient regression testing very difficult. The increase in complexity and difficulty in identifying the proper regression test cases to use can result in missing important test cases to be performed and a misplaced focus by the quality assurance team on non-relevant and/or unimportant other test cases.

In accordance with aspects described herein, keeping adequate track of code changes and mapping code portions to specific test cases can enable the application developer to identify, given specific code changes that occurred, the important test cases to be included in the regression suite. A program code file that goes through specific code changes implements, at least in part, specific application features and it is possible to identify which features such program code file implements. Based on observed code changes, it can be determined which program code file(s) were touched as part of those changes, and therefore which features may have been impacted and are therefore to undergo regression testing. If a feature is spread across multiple program code files (i.e., the code implementing the feature is contained in multiple code files), then a change to one or more such files could inform that regression testing should be performed for that feature using regression tests (regression "test" and "test case" are used synonymously herein) established for that feature.

Accordingly, described herein are approaches for identifying regression test cases for automated regression testing a software application that has undergone code changes. In some cases, a process automatically identifies the regression test cases based on which files that have gone through changes.

One aspect described herein is the creation and maintenance of mappings between the program code files of an application and the application features of that application. FIG. 1 depicts a conceptual diagram of a file-feature map, in accordance with aspects described herein, that maps program code files to the feature(s) they implement. In examples, the mappings are indicated/stored in data structure(s) maintained in computer storage/memory.

Referring to FIG. 1, the application/software layers 102 of an application include a User Interface (UI) layer 104, Business Logic (BL) layer 106 and Data Access (DA) layer 108. The UI layer is made of .HTML, .CSS, .JSP and .JS technologies (as an example) and contains program files with like extensions. The program code files are a collection of files A, . . . , Z in this example.

The BL layer is made of .JAVA, .TCL, .SH, .PY technologies (as an example) and contains program code files with like extensions. The program code files are a collection of files also labeled A, . . . , Z in this example (different files A, . . . , Z from those of the files of the UI layer.

The program code files of the DL layer in this example are not shown in FIG. 1.

Each of the program code files of the UI and BL layers serve one or more purposes in that each is associated with (e.g., provides program code of) a respective one or more application features of the application. Such association constitutes a mapping between that file and the feature(s) it implements. A given program code file can include code that at least partially implements each of one or more features. Any of such feature(s) may be also implemented at least partially by code of one or more other program code files.

FIG. 1 shows example mapping(s) of files to features. Many mappings are omitted in this example for simplicity. The mappings indicate, for each program code file, which of the application features are at least partially implemented by the program code included in that program code file. In FIG. 1, the mappings are shown by arrows 114 to a collection of features 120, the individual features being labeled F1, . . . , Fn in this example. As an example, file Z of the UI layer includes program code partially implementing feature F1 as indicated by an arrow extending from file Z of the UI layer indicated in FIG. 1 to the feature F1 indicated in FIG. 1. File G of the BL layer also partially implements feature F1. Thus, functionality of feature F1 is based at least on program code in file Z of the UI layer and file G of the BL layer. Various other file-feature mappings are indicated in FIG. 1, though only a portion of the entire collection of mappings is presented in FIG. 1.

Program code changes occur when there is a change to an existing file or an addition of a new program code file. If a change occurs, the feature(s) that consume the subject file(s) (i.e., that are at least partially implemented by program code of that file) are to undergo regression testing to ensure that the functions that were not intended to be affected by the changes continue to work. The mappings between the files and the features facilitate identification of the appropriate regression test cases to use by identifying which feature(s) consume the changed program code file(s).

The relationships between files and features as shown in FIG. 1 can be maintained in data structures, for instance tables. An example such table representing the mappings in FIG. 1 is presented below as Table 1.

suite. The file-feature mappings, such as those depicted in the example Table 1, can be shared with all scrums/teams that participate in a release and access the same code. There may be one master set of mappings kept, with all file-feature mapping updates being against that master set when/if code changes result in changes in the mappings. Each team is presented a common, consistent view of the mappings (e.g.,

TABLE 1

|  | UI Layer | | | | | | | | | | Business Logic Layer | | | | | | | | | | Feature |
|---|---|---|---|---|---|---|---|---|---|---|---|---|---|---|---|---|---|---|---|---|---|
|  | A | B | C | D | E | F | G | H | I | Z | A | B | C | D | E | F | G | H | I | Z | Sum |
| F1 |  |  |  |  |  |  |  |  |  | 1 |  |  |  |  |  |  | 1 |  |  |  | 2 |
| F2 | 1 |  |  |  |  |  |  |  |  |  | 1 |  |  |  |  |  |  |  |  |  | 2 |
| F3 |  |  | 1 |  |  |  |  |  |  |  |  |  |  | 1 |  | 1 | 1 |  |  |  | 4 |
| F4 |  |  |  |  |  |  |  |  |  |  |  |  |  | 1 |  |  |  |  |  |  | 1 |
| F5 |  |  |  |  |  |  |  |  |  |  |  |  |  |  |  |  |  | 1 |  |  | 1 |
| F6 |  | 1 |  |  |  |  |  |  |  |  |  |  |  |  |  |  |  |  |  |  | 1 |
| F7 |  |  |  |  |  |  |  |  |  |  |  |  |  |  |  |  |  |  | 1 |  | 1 |
| F8 |  |  |  |  | 1 |  |  |  |  |  |  |  |  |  |  |  |  |  |  |  | 1 |
| F9 | 1 |  |  |  |  |  |  |  |  |  |  |  |  |  | 1 |  |  |  |  |  | 2 |
| F10 |  |  | 1 |  |  |  |  |  |  |  |  |  |  |  |  |  |  |  |  |  | 1 |
| F11 |  |  |  | 1 |  |  |  |  |  |  |  |  |  |  |  |  | 1 |  |  |  | 2 |
| F12 |  |  | 1 |  |  |  |  |  |  |  |  |  |  |  |  |  |  |  |  |  | 1 |
| F13 |  |  |  |  | 1 |  |  |  |  |  |  |  |  |  |  |  |  |  |  |  | 1 |
| F14 |  |  |  |  |  |  | 1 | 1 |  |  |  |  |  |  | 1 |  |  |  |  |  | 3 |
| F15 |  |  |  |  |  |  |  | 1 |  |  |  |  |  |  |  |  |  |  |  |  | 1 |
| F16 |  |  |  |  |  |  | 1 |  |  |  |  |  |  |  |  |  |  |  | 1 |  | 2 |
| F17 |  |  |  |  |  |  |  |  | 1 |  |  |  |  |  | 1 |  |  |  |  |  | 2 |
| F18 | 1 |  |  |  |  |  |  |  |  |  |  |  |  |  |  |  |  |  |  |  | 1 |
| F19 |  |  |  |  |  |  |  |  |  |  |  |  |  |  |  | 1 |  |  |  |  | 1 |
| F20 |  | 1 |  |  |  | 1 |  |  |  |  |  |  |  |  |  |  |  |  |  |  | 2 |
| Fn |  |  |  |  |  |  |  |  |  |  |  |  |  |  |  |  |  |  |  | 1 | 1 |
| FILE SUM | 3 | 1 | 4 | 1 | 1 | 1 | 2 | 1 | 1 | 2 | 1 | 1 | 1 | 1 | 1 | 5 | 2 | 1 | 1 | 2 |  |

Features F1, . . . , Fn are listed vertically on the left side of Table 1 in its first column. The program code file identifiers for files A-I and Z of both the UI layer and BL layer are listed across the top of Table 1 in its second row. Each file-feature mapping is indicated by a numeral '1'. Thus, feature F1 is implemented by program code of program code file Z of the UI layer and file G of the BL layer as indicated by the positioning of the 1s in the row corresponding to F1 in Table 1.

Program code files that are most used across most features could be regarded as particularly important, and therefore their features regression-tested ahead of others if desired. In a similar vein, features can be labeled with a feature priority on which to base prioritization in regression-testing the features. These and other aspects of regression test case selection and prioritization are described in further detail herein.

Figure 2:
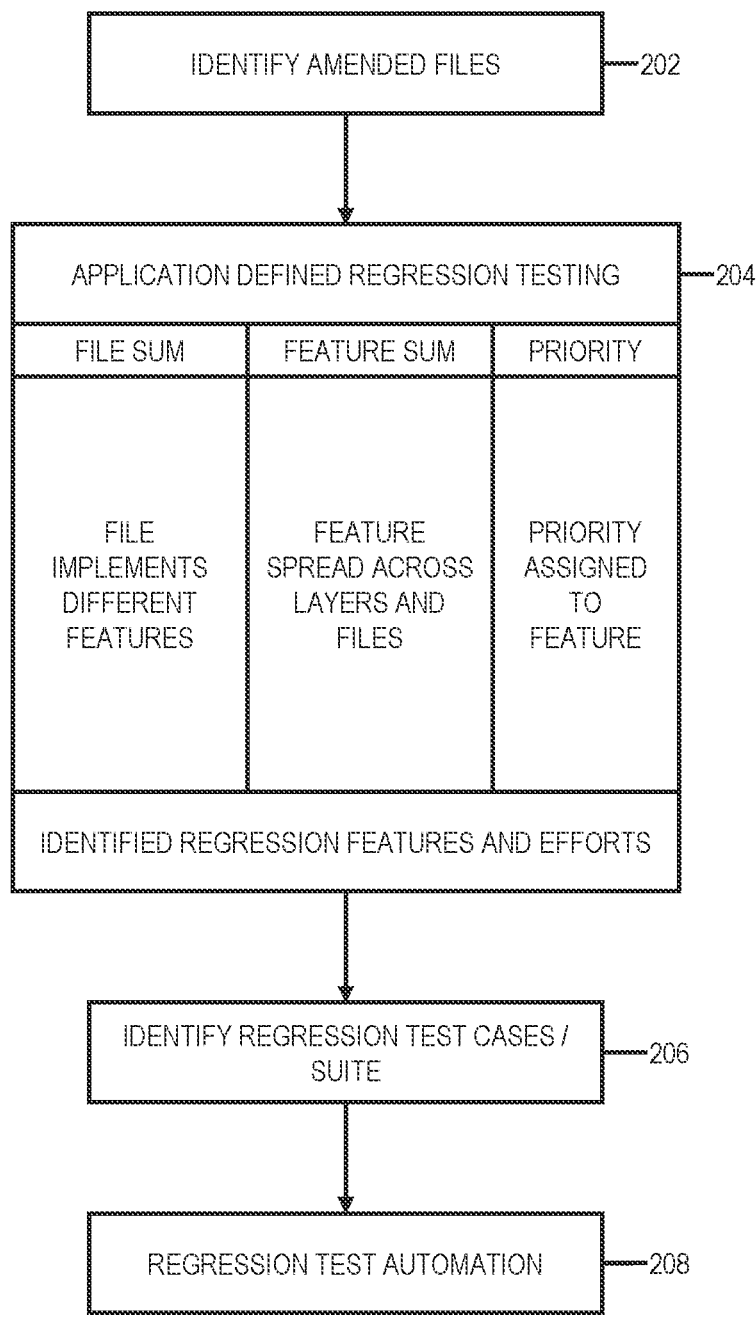
FIG. 2 depicts an example process flow for identifying features and test cases for automated regression testing, in accordance with aspects described herein.

FIG. 2 depicts an example process flow for identifying features and test cases for automated regression testing, in accordance with aspects described herein. Approaches discussed herein for identifying features and test cases can be used in various methodologies of application development, for instance the Agile (e.g., Scrum, Kanban, etc.) and Scaled Agile methodologies, and others. Software development at the enterprise level typically has many teams or 'squads' contributing to a common codebase and rolling out features/solutions in-parallel. Each team has its own set of deliverables focused on completing as many desired features (e.g., committed 'userstories') in their set timelines, which are usually tight. In the process, these teams might interfere with each other's code, causing regression in the application and features thereof. Aspects discussed herein aim to address this problem and provide an application-level regression test through version control software) at any given point in time and each team can update the mappings in real-time. This can help indicate to other teams in real-time the necessity to coordinate with each other in order to sort out any code conflicts, since conflicts could lead to a regression.

Referring to FIG. 2, the process at 202 automatically identifies the program code file(s) that were changed when changes are made to program code of an application. In one example this is done by the continuous integration/continuous delivery (CI/CD) software. Every time a new piece of code is written in a new program code file or an existing file is appended/modified with new code, for instance to support a new feature and/or update an existing feature, this is automatically identified. As noted, the changes could include changes to one or more existing program code files of the program code files making up the application and/or the addition of one or more new program code files to the collection of program code files that make up the application.

The observed code changes might produce a change in which of the program code files implement which of the application features. The corresponding mappings should be kept up to date in this regard to properly reflect any such changes. For instance, file-feature mapping(s) might be created or destroyed depending on the changes being made.

The process proceeds by automatically selecting application feature(s), of the collection of application features that make up the application, as candidate(s) on which to perform automated regression testing. In FIG. 2 this is broadly referred to as application defined regression testing 204. The selected candidates can be those features that are implemented, at least in part, by any program code file in which the code changes are contained. These features are just candidates at that point, as there may be some changes and/or prioritization applied when determining which to actually regression-test, as explained below.

One aspect of selecting the candidate features is electronically accessing the data structure(s), e.g., table(s), that include the mappings between the program code files and the application features. These mappings can inform which files changed and therefore which features may be affected.

Table 2 below depicts an example of how the mappings can reflect a changed program code file.

The process proceeds by commencing (208) execution of the automated regression testing using the selected regression test cases. As an example, the regression testing is initiated to begin automated testing using a first one or more tests of the test suite. As is discussed further below, there may be situations when not all test cases for all of the candidate features are performed, or at least not in initial testing. For instance, in an example where there are multiple selected features to regression test, the process might prioritize the selected regression test cases into an order in

TABLE 2

|    | UI Layer |   |   |   |   |   |   |   |   |   | Business Logic Layer |   |   |   |   |   |   |   |   |   | Feature Sum |
|----|---|---|---|---|---|---|---|---|---|---|---|---|---|---|---|---|---|---|---|---|---|
|    | A | B | C | D | E | F | G | H | I | Z | A | B | C | D | E | F | G | H | I | Z |   |
| F1 |   |   |   |   |   |   |   | 1 |   |   |   |   |   |   |   |   | 1 |   |   |   | 2 |
| F2 | 1 |   |   |   |   |   |   |   |   |   |   |   | 1 |   |   |   |   |   |   |   | 2 |
| F3 |   |   | 1 |   |   |   |   |   |   |   |   |   |   | 1 |   | 1 | 1 |   |   |   | 4 |
| F4 |   |   |   |   |   |   |   |   |   |   |   |   |   |   | 1 |   |   |   |   |   | 1 |

Table 2 presents the rows for the first four features (F1, . . . , F4) from Table 1 above. Here, file C of the UI layer has been modified and this change is reflected by bold, underline of the indicated '1' in Table 2 (this could be indicated in the actual data structure(s) containing the mappings using any desired approach). In one specific example, it is the code of feature F3, and specifically the code contained in file C of the UI layer, that changed.

The process accesses the data structure(s) and performs a lookup therein to identify, as the selected application feature candidate(s), each application feature that is at least partially implemented by program code that is included in any of the program code file(s) identified as having been changed. Thus, for any program code file that includes any change, it is determined which feature(s) that file at least partially implements, and the feature/features are included as candidates. The set of candidates is any feature at least partially implemented by any changed program code file. In some examples, there are multiple changed program code files and there are multiple selected features. From Table 1, it is seen that file C the of UI layer (which has been modified in this example) is consumed by features F3, F10, F12 and F20. These features are selected for potential regression testing. Changed (or added) program code in other files might result in selection of additional features.

Based on the selected application feature(s), the process selects, from a collection of the regression test cases for the application's features, regression test cases to be included in the automated regression testing as the regression test cases/suite (206). Each application feature of the application can have associated with it a set of regression test case(s). The set of test case(s) associated with a particular feature are defined for regression testing that feature. In one example, the regression test case(s) to test a feature are defined when the feature is coded and/or updated. Different features are typically regression tested using different regression test case(s), where the regression test case(s) defined for one application feature can differ from the regression test case(s) defined for another application feature. There may also be test cases that can be used to test different features.

In a particular example, selection of the regression test case(s) to be included in the automated regression test cases selects to include, for each application feature of the selected at least one candidate application feature, the regression test case(s) defined for that feature.

which the automated regression testing is to execute the selected regression test cases. Resource limitations and time-boxing might inform that not all test cases can be performed in initial testing, for example.

Further details are now provided regarding selection and prioritization of regression test cases as part of the application defined regression testing 204.

Table 1 above includes a File Sum (last row) for each program code file. The File Sum is the number of features that the file impacts, i.e., the number of features that the program code of the file at least partially implements. File C of the UI layer impacts features F3, F10, F12 and F20 so its File Sum is 4. File F of the BLL layer impacts 5 Features (F3, F9, F14, F17 and F19) so its File Sum is 5, and the File Sum of file G of the BLL layer is 2. If there are multiple program code files that go through the changes, File Sum can help sequence and/or prioritize the feature regression testing. File Sum could for example be used to compute or otherwise determine/inform the regression test efforts. Depending on scheduling and other factors, the total efforts for the different files might inform when or in which order to regression-test the features implemented by the files.

Accordingly, in one aspect, prioritizing the test cases includes identifying (using File Sum) which one or more program code files, of the identified program code files to which changes were made, includes program code at least partially implementing a greatest number of application features of any of the identified plurality of program code files. The features of file(s) with higher File Sums might be regression tested (using their associated test cases) before regression-testing features of files with lower File Sums, for instance. In other words, File Sum could be used to select which files to prioritize over other files in terms of the regression testing the features thereof. Thus, putting the regression testing in a sequential order of importance could be done based on the number of features that each file impacts. From the above example, the regression order could be: (i) File F of BLL layer (File Sum: 5), (ii) File C of UI layer (4), and then (iii) File G of BLL layer (2).

Table 1 also includes a Feature Sum (last column) for each application feature. The Feature Sum of a feature is the number of files across which the program code to implement feature is spread. Feature F3 is implemented by program code in 4 total files—one in the UI layer and three in the BLL layer—so its Feature Sum is 4. For a software development team, one of the challenges is to estimates the efforts when a bug is discovered. Someone who might not be fully aware of the feature's program code and where it lies (e.g., across different layers and files) might utilize the Feature Sum to help address this challenge.

As noted, Feature Sum is the total number of program code files, across the layers, in which the feature code is spread. It helps to quickly identify the files-per-feature to understand the work involved and assess other aspects of a bug fix. If there are bugs identified in features F3, F14 and F17, and changes are to be made to those features to address the bugs, then a developer could use Feature Sum to identify the number of files involved—F3 is spread across 4 files, F14 is spread across 3 files, and F17 is spread across 2 files (see Table 1). The number of files involved is suggestive of total work involved to address the bug, which could include regression testing it based on code changes. In many cases, the work involved is more for feature F3 when compared to the work involved for F14 and F17 since feature F3 is spread across more files. In this manner, the Feature Sum can be used to compute the development/bug fix efforts and potentially prioritize the fixes based on the efforts involved and resources (time, people, etc.) available.

In an aspect of prioritizing regression test cases, the prioritizing can include identifying, for each candidate application feature, a number of program code files (e.g., Feature Sum) that include program code at least partially implementing that application feature, which is indicative of an amount of development resources (e.g., development/bug fix efforts), and then prioritizing the regression test cases based on the amount of development resources for those candidate application features. In this manner, the Feature Sum could help prioritize the fixes based on the efforts involved and therefore the regression testing to be performed based on which fixes are handled first.

In additional or alternative to File Sum and/or Feature Sum, a Feature Priority may be assigned to the application features. There are often time constraints in an Agile software development backdrop (as one example) and thus developers struggle in prioritizing their focus because there is often not enough time to deliver everything. Prioritizing the Features or bugs to address/work on can be key.

As seen in Table 3 below, each feature is assigned a priority tag (last column) referred to herein as Feature Priority. Each feature is indicated with a priority for each file at least partially implementing that feature. Feature F1 for instance is implemented in file Z of the UI layer and File G of the BLL layer. The priority for each is indicated as 3, and so the Feature Priority (last column) indicates 3 as the priority of feature F1. The Feature Priority may be a function of the individual priorities of that feature across its files, for instance the highest/maximum of any such assigned priority.

TABLE 3

| | UI Layer | | | | | | | | | | Business Logic Layer | | | | | | | | | | Priority |
|---|---|---|---|---|---|---|---|---|---|---|---|---|---|---|---|---|---|---|---|---|---|
| | A | B | C | D | E | F | G | H | I | Z | A | B | C | D | E | F | G | H | I | Z | |
| F1 | | | | | | | | | | 3 | | | | | | | 3 | | | | 3 |
| F2 | 1 | | | | | | | | | | 1 | | | | | | | | | | 1 |
| F3 | | | 2 | | | | | | | | 2 | | | 2 | 2 | | | | | | 2 |
| F4 | | | | | | | | | | | | | | | 2 | | | | | | 2 |
| F5 | | | | | | | | | | | | | | | | | | | 1 | | 1 |
| F6 | | 2 | | | | | | | | | | | | | | | | | | | 2 |
| F7 | | | | | | | | | | | | | | | | | | | 1 | | 1 |
| F8 | | | | | 2 | | | | | | | | | | | | | | | | 2 |
| F9 | 1 | | | | | | | | | | | | | | | | | 1 | | | 1 |
| F10 | | | 3 | | | | | | | | | | | | | | | | | | 3 |
| F11 | | | | 1 | | | | | | | | | | | | | | 1 | | | 1 |
| F12 | | | 3 | | | | | | | | | | | | | | | | | | 3 |
| F13 | | | | | 1 | | | | | | | | | | | | | | | | 1 |
| F14 | | | | | | | 2 | | 2 | | | | | | | | 2 | | | | 2 |
| F15 | | | | | | | | | 1 | | | | | | | | | | | | 1 |
| F16 | | | | | | | 1 | | | | | | | | | | | | | 1 | 1 |
| F17 | | | | | | | | | | | | | 3 | | | 3 | | | | | 3 |
| F18 | 1 | | | | | | | | | | | | | | | | | | | | 1 |
| F19 | | | | | | | | | | | | | | | | | | 1 | | | 1 |
| F20 | | | 3 | | | | | 3 | | | | | | | | | | | | | 3 |
| FN | | | | | | | | | | | | | | | | | | | | 3 | 3 |

Features could be assigned a priority based on any desired factor(s). Examples include, but are not limited to, the Return-on-Investment (ROI) determined for the feature, the frequency at which the feature is used in the application, or any other business aspect. In Agile, the Product Owner (PO)/Manager can set a priority as to what goes into the release and participates in the scrum to prioritize the areas (feature development, field support, bug fixes, etc.) where team efforts must be directed. With the help of Feature Priority, the involvement of the PO could be substantially reduced, enabling the team to work more independently in terms of its decision making.

Accordingly, Feature Priority could help prioritize, in some cases as another layer on the top of an already-prioritized list based on, e.g., File Sum and/or Feature Sum discussed above. Take an example where there are bugs that need to be fixed per features F3, F9 and F1 in files C of UI layer (File Sum 4), F of BLL layer (File Sum 5) and G of BLL layer (File Sum 2). File Sum indicates the number of features impacted by the change and helps identify the regression test cases in conjunction with Table 1, Feature Sum indicates the number of files that involve a feature and helps compute the efforts involved, and Feature Priority helps conclude on potential scoping, prioritizing, and time boxing for the regression testing, i.e., based on the priorities set for the features. The test cases to be performed can be prioritized according to the priorities assigned the associated application features. For instance, highest priority features of the already-prioritized features (from the File Sums and/or Feature Sums) may be those tested first by way of their regression tests. All test cases for feature F3 might be prioritized before any of features F1 and F9, and test(s) for feature F1 or F9 might be next-prioritized depending on remaining time or time-boxing, as an example.

Each of File Sum, Feature Sum, and Feature Priority may be used alone or in conjunction with one or more of the others, as desired.

Figure 3A:
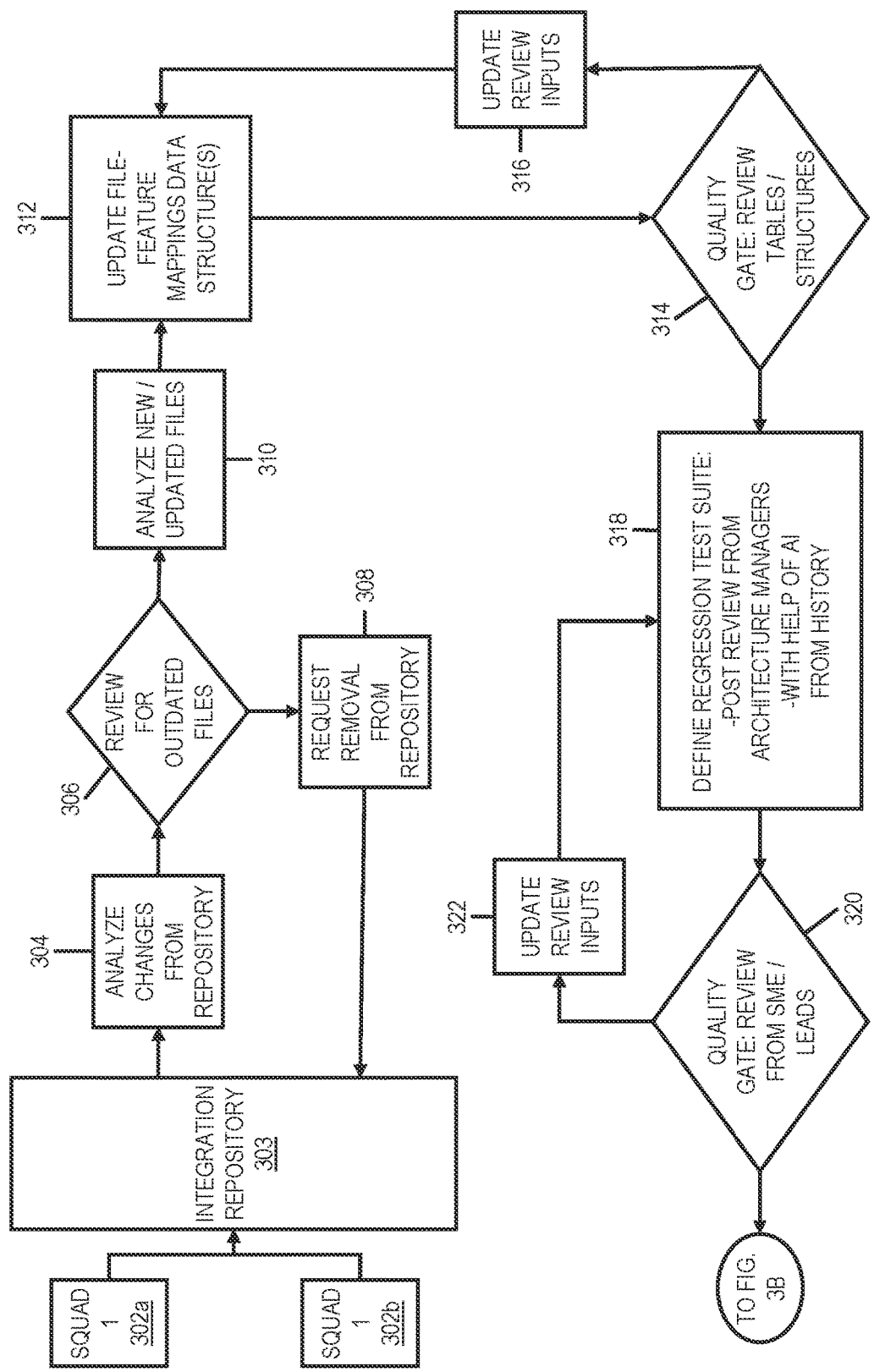
FIGS. 3A-3B depict an example conceptual diagram of an application development process incorporating aspects discussed herein.
Figure 3B:
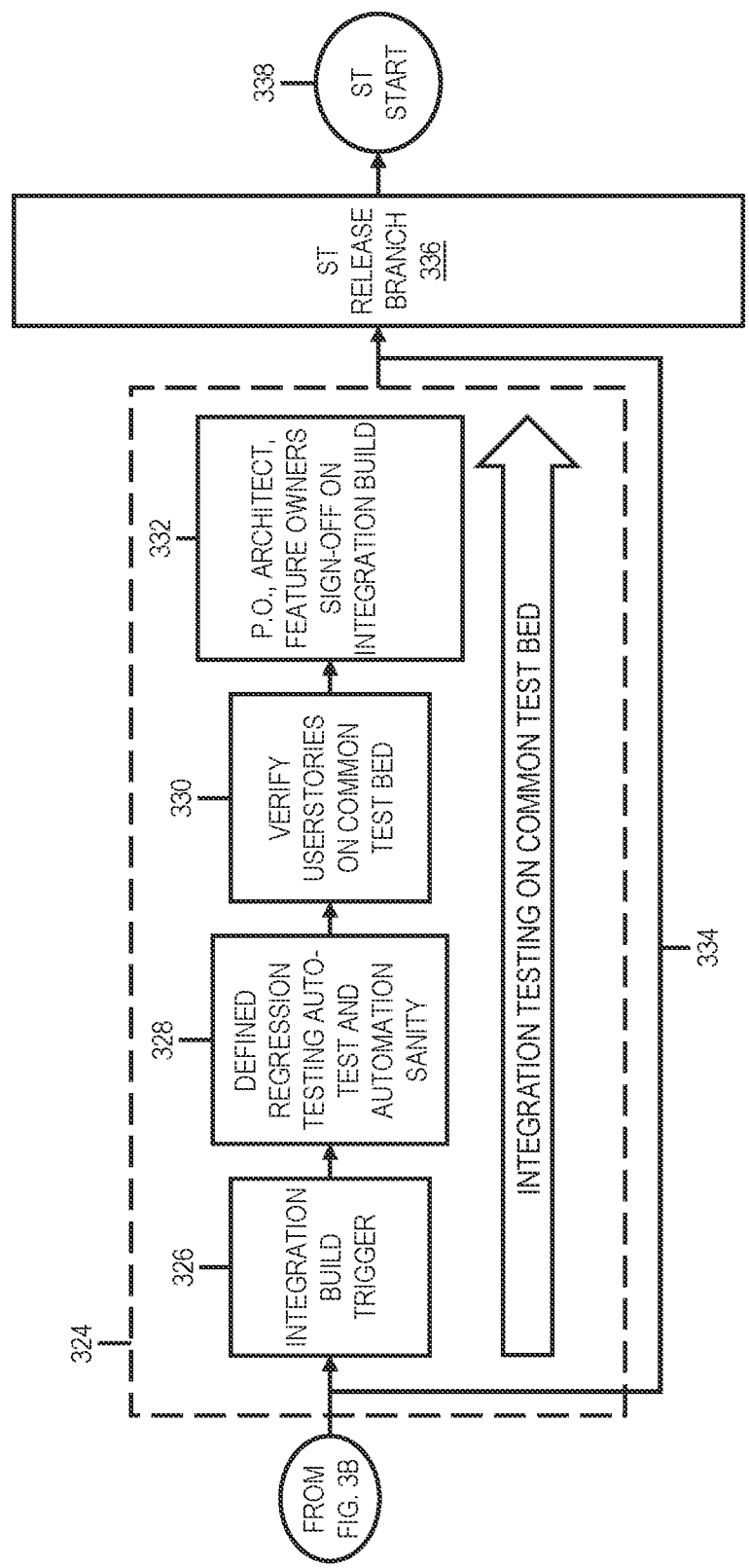

FIGS. 3A-3B depict an example conceptual diagram of an application development process incorporating aspects discussed herein. The development process in this example involves different teams/squads 302a, 302b that develop the various aspects of an application, pushing updated file(s) to an integration (e.g., GIT) repository 303 that integrates program code files for application builds. In a scaled Agile backdrop with multiple independent teams developing features, solutions, products, etc., their code is integrated together in the integration repository 303. The data structure(s) holding the file-feature mappings described above could also reside in the integration repository.

The multiple squads might work against common files. One team might be unaware of changes of a file by the other team until a later time when the one team checks-in its version of the file to the repository. Version control software is commonly used to address these situations. In one particular example, there may be an alert regarding multiple changes/conflicts, requiring the selection of which changes to actually implement in the integration repository.

In any case, changes are integrated and the rest of the process of FIG. 3A is triggered. Specifically, a tool analyzes (304) program code changes from the repository to identify properties of the changes, for instance the number of existing files that underwent changes, the number of new code files added, and the number of files for each feature/solution, as examples. At 306 there is an inquiry and review for outdated files with respect to solutions/features. If a feature/solution is dropped or no longer supported, based on the changes, then the process proceeds to request (308) that stakeholders remove outdated files and check those changes into the integration repository. The flow returns to the squad at that point to prompt it to address those file(s), e.g., remove them or make them obsolete, for instance.

Assuming no outdated or extraneous files in terms of features supported, the process analyzes (310) the new/updated program code files based on (i) architecture/design documents, (ii) business requirements, and (iii) solution documents. This aspect is related to technical debt, referring generally to when aspects of the current application are not necessarily in-sync with what was initially intended. Often after a request/requirement is received for an application under development, there are development cycles—typically, analysis, assessment, design, architecture, development, testing, bug resolution, and then deployment and maintenance. The request or requirement is some original expectation for the feature but that feature might not take the shape that is was originally expected and intended to take by the time that feature is delivered/deployed. This is because of gaps in the development process—the requirement was not understood properly, the design did not consider certain aspects of the feature and missed things, or the tester did not test a particular aspect, as examples. There are all different kinds of gaps. These are wrapped into what is termed 'technical debt'. As development progresses, there may be many expectations that were not delivered-upon. Aspect 310 of FIG. 3A is directed to an analysis of the new/updated files based on the requirements for the application, then identification of the gaps (bugs, missing feature, etc.) as a feeder (e.g., as a userstory) for the next cycle to deliver on those gaps.

Continuing with FIG. 3A, the process updates (312) the file-feature mapping data structure(s), for instance the mappings and priorities if applicable. This is followed by a quality gate at 314 to review the table(s)/data structures from architecture managers. This review is to determine whether the mappings (showing which files implement which features) is consistent with the intended design. Business logic implemented in files of the UI layer, as an example, is likely undesirable. A quality gate is generally a milestone check to inquire whether prerequisites have been met in order to proceed. It can be an important mechanism to make sure that key indicators of quality are not compromised in the face of often rushed timelines for delivery. Managers can utilize these to validate at various stages that what has been developed thus far is of an acceptable quality.

The approach for deriving application level regression test cases can benefit from these quality gates to ensure quality continues to improve. A factor in arriving at proper test cases is proper file-feature mappings, and the mappings should be kept up-to-date each time there is a change. The quality gate 314 can help ensure that each time there is a change in File Sum, Feature Sum and/or Feature Priority, this is subjected to a quality review process.

Creation and updating of the file-feature mappings can be based on the artifacts available before the team has fully delved into the further software development. Each team with the help of its architect could refer to artifacts such as the Business Requirements, Architecture, Design, Solution Documents, etc. and arrive at what would be the prospective new mappings/changes in existing mappings. This process can be followed by each scrum team/track to exposing the most common files to go through regression, making all teams aware of that in order to discuss and agree on the approach for the final architecture/solution design with all team representatives onboard. In some examples, this could eliminate 60 to 70% of regression testing that might otherwise be performed.

Nonetheless, not all features are developed and finalized based on the initial design. The file-feature mappings change during other cycles of software development and thus the scrum teams could continue to update the mappings to yield the best results. In some examples, the code reviewer also reviews the file-feature mappings and provides feedback to the developer/quality assurance (QA) teams (identified using the version control software, based on the changes that the team is making, for instance) that will be impacted due to these changes, reducing surprises that these changes may otherwise bring to the other teams, and thus avoid impact on the release.

There may be outcomes of the review at 314 that require changes and therefore the process can proceed to 316 to update review inputs and return to 312, i.e., to update the table(s) as necessary. In this manner, the architecture managers manage the mappings based on what the developer pool is turning-out and whether it is appropriate.

Assuming the quality gate 314 passes, the process proceeds to 318 to define the regression test suite. This is after architecture manager review (at 314) and may involve artificial intelligence (AI), for instance a machine learning-based cognitive engine. Using the updated mappings, the regression test suite (suite of regression test cases) is identified. The suite might require approval from a relevant stakeholder.

As mentioned, AI could be leveraged. For instance, historical testing results might inform of test cases, initially included in the suits, should be omitted, and/or test cases that were originally omitted from the suite should be added. Thus, the selecting the regression test cases to be included in the automated regression testing (FIG. 2, 204) can include using a cognitive engine trained via machine learning and historical regression testing results to identify one more regression test case(s) to include in the selected regression test cases, and/or regression test case(s), initially proposed for inclusion in the selected regression test cases (the suite at 206), to exclude from the selected regression test cases.

In a particular example, the cognitive engine might inform that a particular regression test case that, practically speaking, always passes in similar situations, is therefore not worth performing as part of the suite.

Another quality gate exists at 320 where there is a review from subject-matter expert (SME)/leads. This quality gate s to review the test cases that have been identified in the testing suite. A SME might hold a particularly useful understanding of the product, features, etc. Leaders of a department might desire to sign-off on the selected test suite in case there are challenges with resources such as time or cost. To the extent there is feedback from that review the necessitates changes to the test suite, the process proceeds to update the review inputs (322) and return to 318 to tweak the test suite.

The above-mentioned quality gates at 314 (planning phase) and 320 (development phase) can be key to reducing extraneous regression testing. Moreover, the utility is extended even further when these become criteria to merge into a release branch and verify respective features/solutions in integration testing. A third quality gate of sorts, continuous integration testing discussed below, can expose much of the remaining regressions caused from technical debt (e.g., deviation from the initial plan outlined by the architects in the initial planning phase). These three quality gates in place can facilitate smooth system testing and subsequent release product.

Assuming quality gate 320 is passed, the process proceeds to continuous integration testing 324 of FIG. 3B. Continuous integration testing can be verified on common test bed, rather than in a squad test environment for instance. The continuous integration testing 324 commences when the integration build is triggered (326). The product is bundled and packaged with the contributions from the squads and is now ready to be installed/deployed. This is termed the integration build.

The process proceeds with automated regression testing with the selected test suite and a standard automation sanity check (328). The process verifies the userstories on the common test bed (330) to understand whether what was requested (by way of userstories) was satisfied. Then the Product Owner (PO), Architect, and/or Feature Owner(s) sign-off on the integration build (332). That is the end of a so-called "sprint". The integration build and test could be performed at the end of every sprint, feature development, etc. or once all the features are developed, as examples.

Continuous integration testing, being continuous, might therefore repeat this as indicated by arrow 334. At some point there is a 'final sprint' that completes. At this point the feature/changes added in the present release have been integrated into the prior-version product and the product has now passed regression testing. The integration build is then pushed out as a system test (ST) release to the ST branch 336 for system-testing the build at 338.

Further details are provided about technical debt and relation to aspects described herein. One of the key by-products of software of compromised quality is the legacy of technical debt that it creates and the challenges it brings in addressing it. Product documentation might state that a given feature incorporates functionality X, Y and Z but identified technical debt might suggest that the feature was not developed with such functionality. That gap might be raised as detected bugs, in document reviews, or from user feedback, as examples. Sometimes the gap is not raised at all. Debt can continue to mount on account that development resources (like time and money) may be prioritized on delivering the customer's priorities rather than directly addressing existing technical debt, especially if that debt is undiscovered.

It can be challenging to track the technical debt created and compounded by the development process. Application development proceeds through various phases and at each stage generates artifacts that can be key to reaching conclusions and shaping solutions. Any deviation from the initial plan/design can affect the downstream product in many ways. Going from the solution/feature as conceptualized, then to the representation 'on paper', then to how it was coded can create technical debt that may be difficult to track. If the debt is not tracked and addressed, this could pose serious threats to the software product's long-term viability.

Processes discussed herein can facilitate tracking this deviation, creating a 'debt-mesh' that can suggest the quantity or magnitude of the deviation, and enable the team to ascertain the impacts that it has created. In this regard, an aspect of a process can track changes in the mappings across stages of the application's development, and identify, based on the changes in the mappings over time, technical debt that informs of inefficiencies in development processes that are to develop and maintain the application. The debt-mesh can be created as follows: The file-feature mappings (e.g., as in Table 1) are updated at every stage/phase of software product development. This encompasses, as part of the mappings, the File and Feature Sums. The process captures a snapshot of the file-feature mappings at each such stage. Over time, the process tracks the changes in Feature Sum and File sum across these stages of software product development. The lesser the deviation (evaluated using any desired approach) in Feature Sum and File Sum from one point (such as inception) to a subsequent point (such as a release), the lesser the technical debt that exists; a greater deviation indicates higher technical debt.

A high degree of technical debt suggests potential major problems. Significant deviation can suggest that the developer did not understand a request/requirement, did not design the feature (translate it into an architecture) correctly, did not develop it correctly, and/or did not test is correctly, as examples. This can be effective at illustrating where the breakdowns occur in the development process. The data could be used across releases to identify the common area where development is failing. It may then be desired to prioritize finding solutions to those problems highlighted by the debt mesh.

Advantageously, aspects disclosed herein provide for identification of files that are common across features and what files make up a feature, and provide a model that aids development and quality assurance teams to estimate efforts and define scope of development, aids in identifying regression test cases, and aids in planning and prioritizing bug fixes. Additionally, historical testing data can be fed into a cognitive engine to generate a pattern of regressions over time and take corrective actions or learn to improve the process and timelines, including identification of test cases to include or omit. Quality Gates can be used to ensure that the regression suite is in its best form, and maintenance of file-feature mappings helps reduce uncertainty in efforts, timeframes, and forecasting. Aspects apply to any software development model, and can be used to identify technical debt in a software product accumulate during its lifetime.

Figure 4:
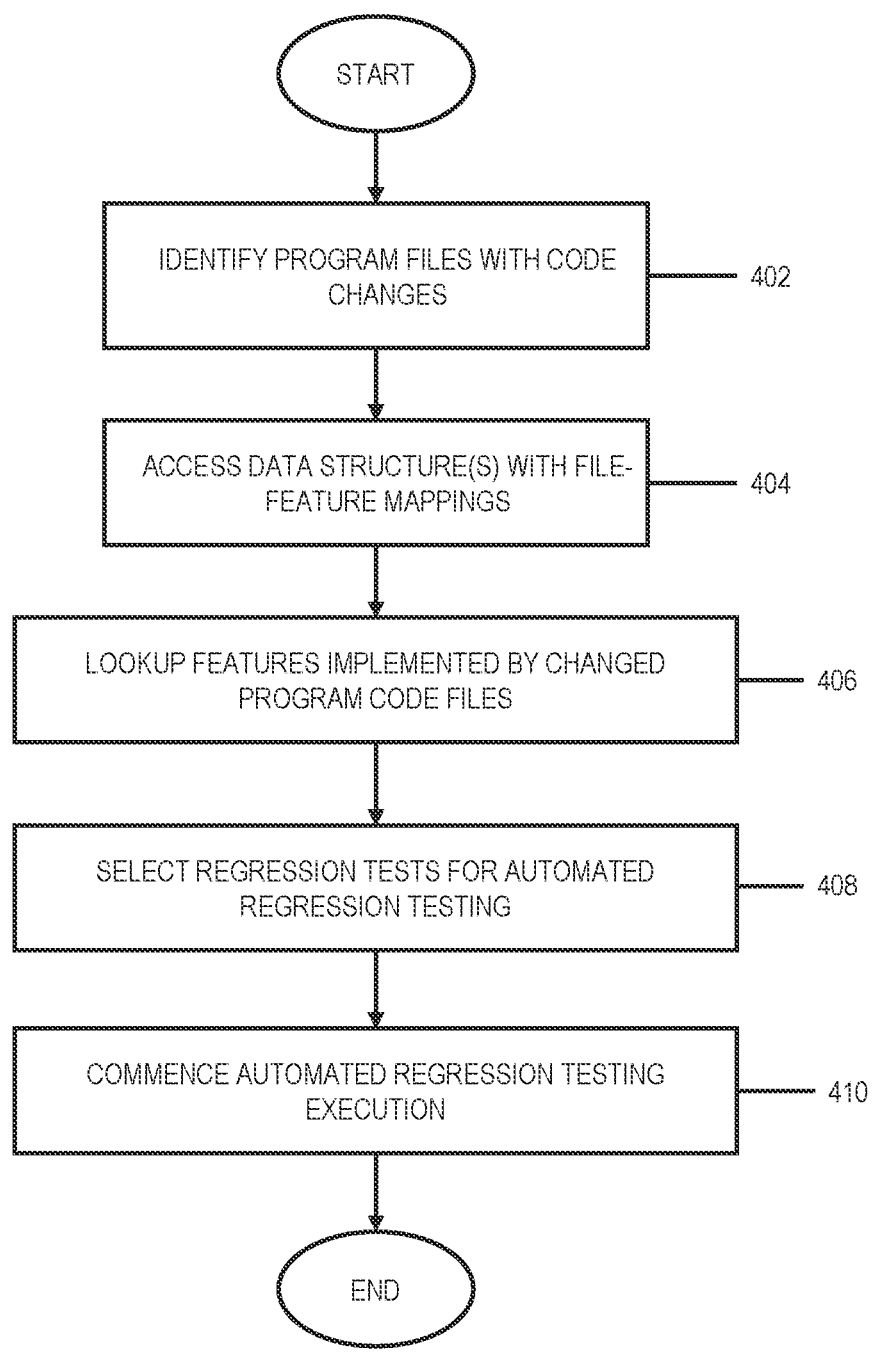
FIG. 4 depicts an example process for regression test case identification and automated regression testing an application, in accordance with aspects described herein.

FIG. 4 depicts an example process for regression test case identification and automated regression testing an application, in accordance with aspects described herein. In some examples, the process is performed by one or more computer systems, such as those described herein.

Initially, based on changes made to program code of an application, the program code of the application being included in program code files and implementing a plurality of application features of the application, the process automatically identifies (402) at least one program code file, of the program code files, in which the changes are contained. In examples, the changes are to existing program code file(s) of the program code files and/or are program code of program code file(s) that have been newly added to the program code files of the application.

In some embodiments, the application includes multiple functional layers that implement the plurality of application features. Different sets of the program code files could include program code that implements different functional layers of the multiple functional layers. At least one application feature of the plurality of application features can be implemented by program code that is included in a plurality of different program code files, i.e., that each at least partially implement a plurality of different functional layers of the multiple functional layers.

The process of FIG. 4 then is to automatically select at least one application feature, of the plurality of application features, as at least one candidate on which to perform automated regression testing. Thus, the process proceeds to electronically access (404) one or more data structures that include mappings between the program code files and the plurality of application features. The mappings indicate, for each program code file of the program code files, which of the plurality of application features are at least partially implemented by the program code included in that program code file. As part of this access or in a separate access, the process could update the mappings between the program code files and the plurality of application features based on the changes (identified at 402) changing which of the program code files implement which of the plurality of application features. For instance, if a change made to a program code file adds code to partially implement a feature, the mappings are updated to reflect this.

In any case, the process continues with the automatic selection of the at least one application feature by performing (406) a lookup in the accessed one or more data structures and identifying, as the selected at least one application feature that is/are candidate(s) for regression testing, each application feature that is at least partially implemented by program code included in any of the identified at least one program code file in which the changes are contained.

Based on the selected at least one application feature, the process proceeds by selecting (408), from a plurality of regression test cases defined for the plurality of application features, regression test cases to be included in the automated regression testing. In examples, each application feature of the plurality of application features has an associated set of regression test cases defined for regression testing that application feature. The set is specific to that feature, therefore the set of regression test cases defined for one application feature of the plurality of application features can differ from the set of regression test cases defined for another application feature of the plurality of application features. As part of selecting the regression test cases to be included in the automated regression testing (at 408), the process could, for each application feature of the selected at least one application feature, include in the selected regression test cases each of the regression test cases that is/are defined for that feature. In this manner, for each feature of any changed program code file, the process can identify and select the test case(s) for that feature.

Selecting the regression test cases to be included in the automated regression testing can include using a cognitive engine trained via machine learning and historical regression testing results to identify (i) regression test case(s), of the plurality of regression test cases, to include in the selected regression test cases, and/or (ii) regression test case(s), initially proposed for inclusion in the selected regression test cases, to exclude from the selected regression test cases.

With the regression test cases to be used in the regression testing selected, the process commences (410) execution of the automated regression testing using the selected regression test cases. It is noted that for one reason or another— perhaps some prioritization applied—the test cases may be run in an order and perhaps some test cases (at the end of the queue) may be postponed or not run at all. This may depend on timing and other factors that might limit the amount of testing that can be performed in a given timeframe.

In some examples, the identified at least one program code file includes an identified plurality of program code files, the selected at least one application feature includes a selected plurality of application features, and the process further includes prioritizing the selected regression test cases into an order in which the automated regression testing is to execute the selected regression test cases. Such prioritization may use file sum, feature sum, and/or feature priority in terms of selecting, sequencing, prioritizing, and/or timing the performance of the regression test cases.

The prioritizing could include, for instance, identifying which one or more program code files, of the identified plurality of program code files containing the code changes, includes program code at least partially implementing a greatest number of application features of any of the identified plurality of program code files, and prioritizing regression test cases, of the selected regression test cases, that regression test the application features at least partially implemented by program code included in such identified one or more program code files implementing a greatest number of application features. A File Sum of a file indicates the number of application features program code of the file at least partially implements and can inform regression test efforts for used in sequencing and/or prioritizing feature regression testing.

Additionally or alternatively, the prioritizing could include identifying, for each application feature of the selected plurality of application features, a number of program code files that include program code at least partially implementing that application feature (the "Feature Sum"). The Feature Sum can be indicative of an amount of development resources for working on, developing, bug fixing, etc. the feature. The process could prioritize regression test cases, of the selected regression test cases, based on the amount of development resources for the selected plurality of application features (e.g., which features require more resources).

Additionally or alternatively, there could be a feature priority assigned to the application features and the prioritizing could include prioritizing regression test cases, of the selected regression test cases, based on a respective priority assigned to each of the selected plurality of application features. The priority assigned to an application feature could indicate a priority in regression testing that application feature. In some examples, a prioritized list of test cases (for instance based on File Sum and/or Feature Sum) could be further prioritized using the feature priority indicators. This may be useful when there are several feature/test cases otherwise prioritized evenly; those of higher feature priority can be further prioritized over those of lower feature priority.

The data structure(s) with the mappings can be shared across a plurality of teams that participate in development of the application, which development includes implementing changes to the program code files, and the process can further include maintaining a consistent set of the data structure(s), for instance using version control.

In addition, the process could track changes in/to the mappings across stages of development of the application. By tracking the changes, it can be observed how feature code distribution and position (e.g., different files, different application layers, etc.) change over time. This may be useful in identifying, based on the changes in the mappings over time, technical debt informing of inefficiencies in development processes that develop and maintain the application.

Although various examples are provided, variations are possible without departing from a spirit of the claimed aspects.

Figure 5:
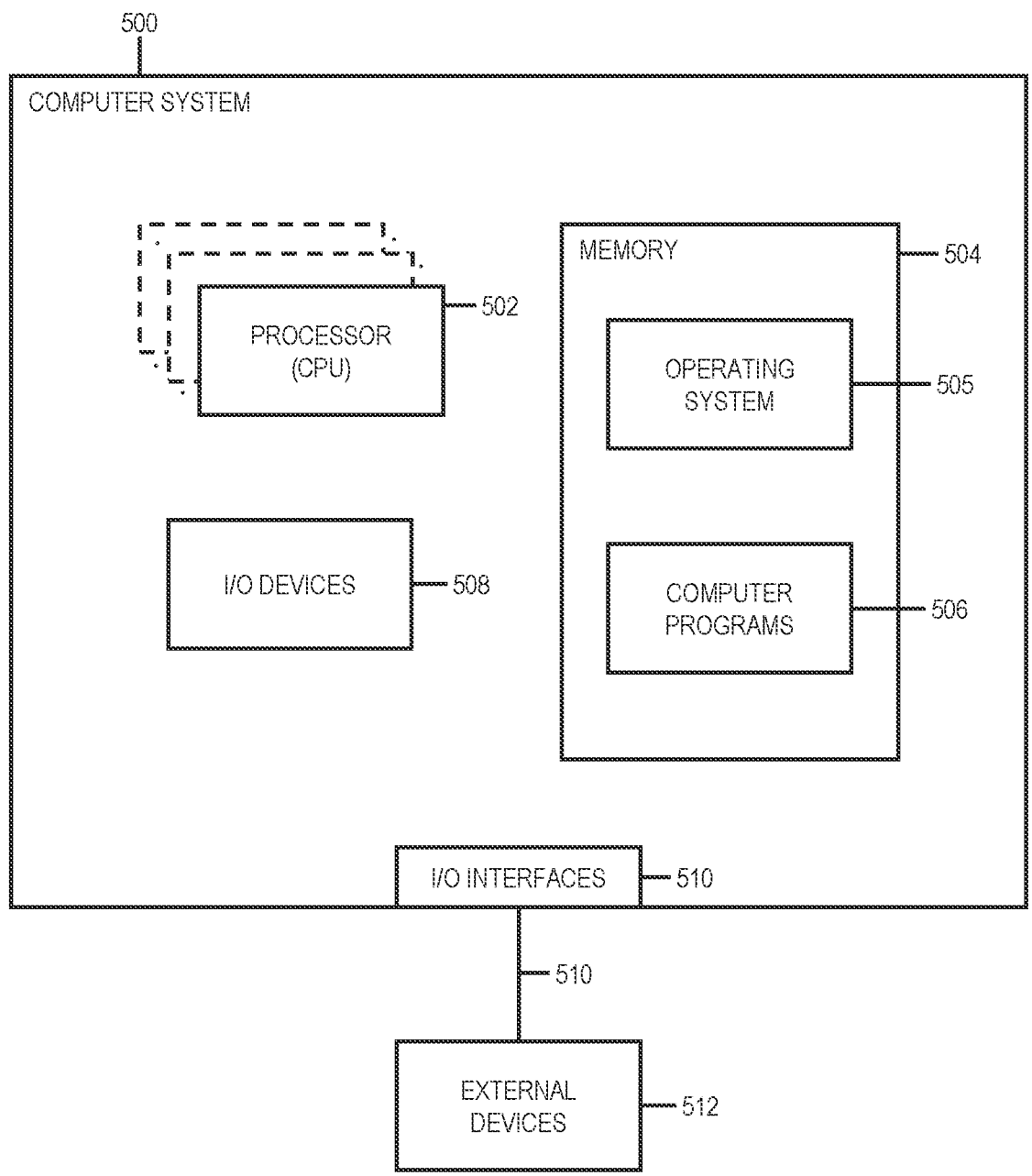
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g., Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g., as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
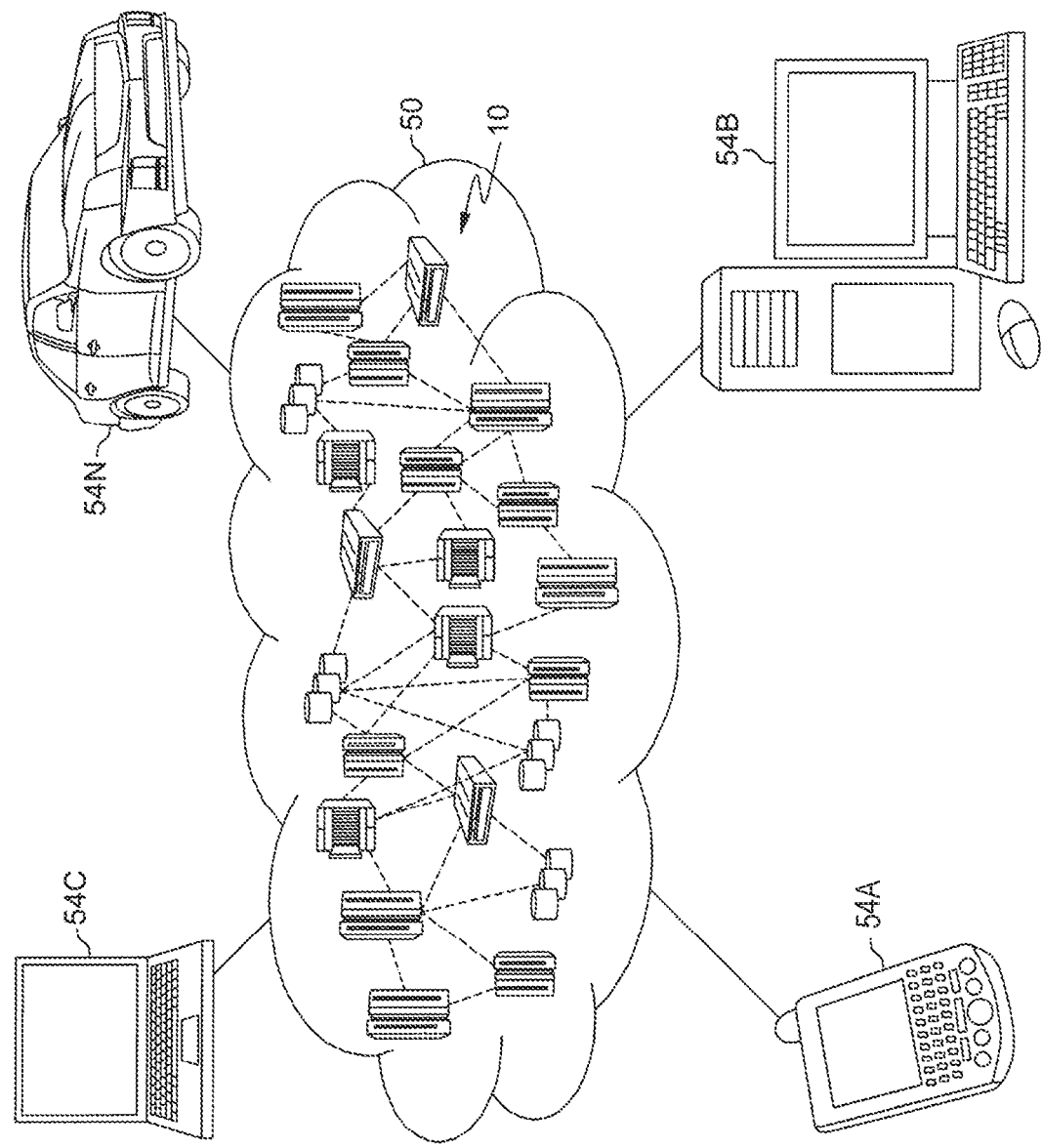
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
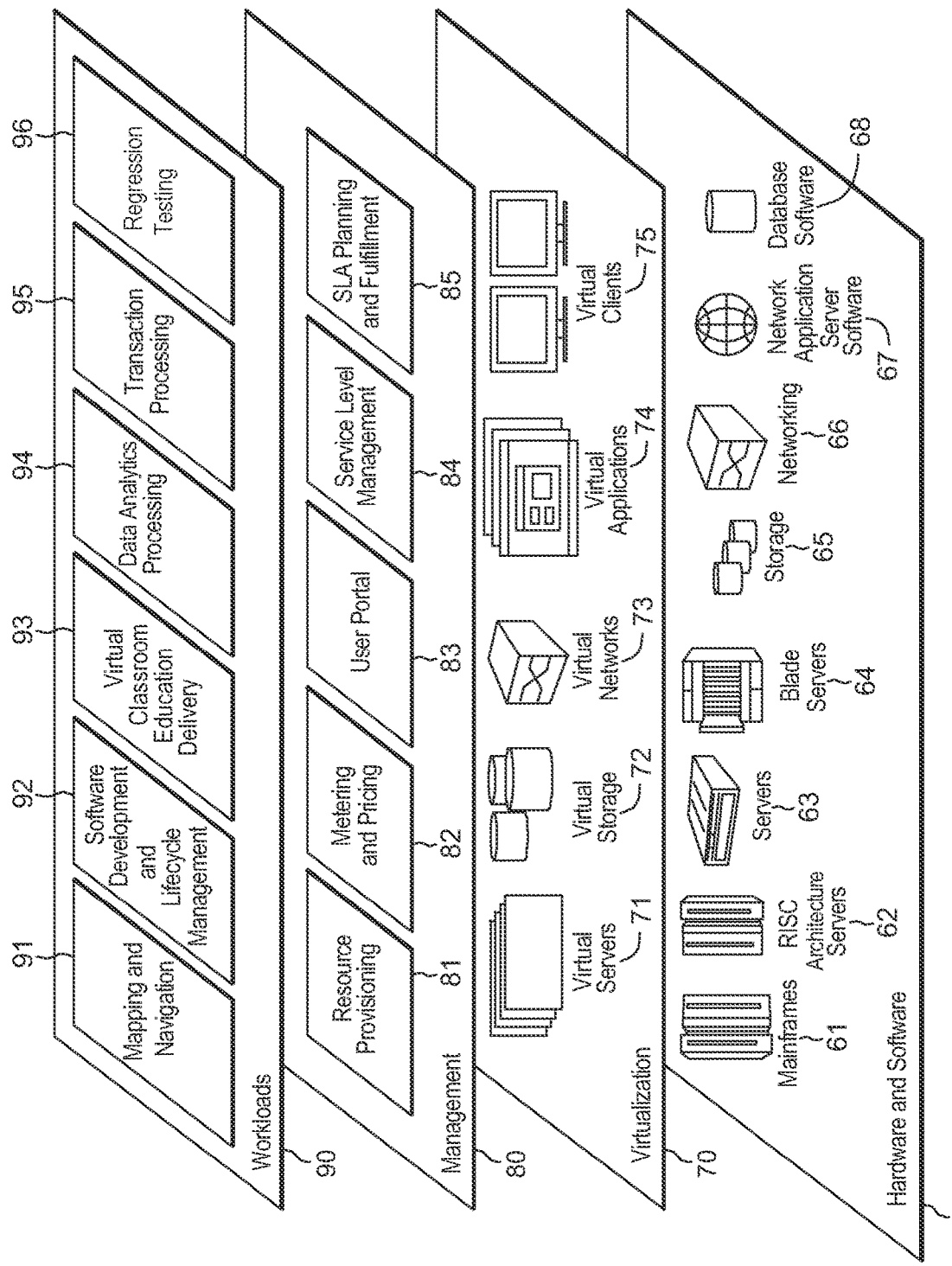
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and regression testing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
based on changes made to program code of an application, the program code of the application being included in program code files and implementing a plurality of application features of the application, automatically identifying at least one program code file, of the program code files, in which the changes are contained;
automatically selecting at least one application feature, of the plurality of application features, as at least one candidate on which to perform automated regression testing, the automatically selecting comprising:
electronically accessing one or more data structures comprising mappings between the program code files and the plurality of application features, the mappings indicating, for each program code file of the program code files, which of the plurality of application features are at least partially implemented by the program code included in that program code file;
performing a lookup in the accessed one or more data structures and identifying, as the selected at least one application feature, each application feature that is at least partially implemented by program code included in any of the identified at least one program code file;

based on the selected at least one application feature, selecting, from a plurality of regression test cases defined for the plurality of application features, regression test cases to be included in the automated regression testing; and commencing execution of the automated regression testing using the selected regression test cases.

2. The method of claim 1, wherein each application feature of the plurality of application features has an associated set of regression test cases defined for regression testing that application feature, wherein the set of regression test cases defined for one application feature of the plurality of application features differ from the set of regression test cases defined for another application feature of the plurality of application features, and wherein the selecting the regression test cases to be included in the automated regression testing comprises, for each application feature of the selected at least one application feature, including in the selected regression test cases each of the regression test cases defined for that feature.

3. The method of claim 1, wherein the identified at least one program code file comprises an identified plurality of program code files, wherein the selected at least one application feature comprises a selected plurality of application features, and wherein the method further comprises prioritizing the selected regression test cases into an order in which the automated regression testing is to execute the selected regression test cases.

4. The method of claim 3, wherein the prioritizing comprises:
identifying which one or more program code files, of the identified plurality of program code files, includes program code at least partially implementing a greatest number of application features of any of the identified plurality of program code files; and
prioritizing regression test cases, of the selected regression test cases, that regression test the application features at least partially implemented by program code included in the identified one or more program code files.

5. The method of claim 3, wherein the prioritizing comprises:
identifying, for each application feature of the selected plurality of application features, a number of program code files that include program code at least partially implementing that application feature, the number of program code files that include program code at least partially implementing that application feature being indicative of an amount of development resources; and
prioritizing regression test cases, of the selected regression test cases, based on the amount of development resources for the selected plurality of application features.

6. The method of claim 3, wherein the prioritizing comprises prioritizing regression test cases, of the selected regression test cases, based on a respective priority assigned to each of the selected plurality of application features, the priority assigned to an application feature indicating priority in regression testing that application feature.

7. The method of claim 1, wherein the changes comprise at least one selected from the group consisting of: changes to an existing program code file of the program code files, and addition of a new program code file to the program code files.

8. The method of claim 1, further comprising updating the mappings between the program code files and the plurality of application features based on the changes changing which of the program code files implement which of the plurality of application features.

9. The method of claim 8, wherein the one or more data structures are shared across a plurality of teams participating in development of the application, including implementing changes to the program code files, and wherein the method further comprises maintaining a consistent set of the one or more data structures using version control.

10. The method of claim 8, further comprising tracking changes in the mappings across stages of development of the application, and identifying, based on the changes in the mappings over time, technical debt informing of inefficiencies in development processes that develop and maintain the application.

11. The method of claim 1, wherein the application comprises multiple functional layers implementing the plurality of application features, wherein different sets of the program code files include program code implementing different functional layers of the multiple functional layers, and wherein at least one application feature of the plurality of application features is implemented by program code included in a plurality of different program code files that at least partially implement a plurality of different functional layers of the multiple functional layers.

12. The method of claim 1, wherein the selecting the regression test cases to be included in the automated regression testing comprises using a cognitive engine trained via machine learning and historical regression testing results to identify at least one selected from the group consisting of: (i) a regression test case, of the plurality of regression test cases, to include in the selected regression test cases, and (ii) a regression test case, initially proposed for inclusion in the selected regression test cases, to exclude from the selected regression test cases.

13. A computer system comprising:
a memory; and
a processor in communication with the memory, wherein the computer system is configured to perform a method comprising:
based on changes made to program code of an application, the program code of the application being included in program code files and implementing a plurality of application features of the application, automatically identifying at least one program code file, of the program code files, in which the changes are contained;
automatically selecting at least one application feature, of the plurality of application features, as at least one candidate on which to perform automated regression testing, the automatically selecting comprising:
electronically accessing one or more data structures comprising mappings between the program code files and the plurality of application features, the mappings indicating, for each program code file of the program code files, which of the plurality of application features are at least partially implemented by the program code included in that program code file;
performing a lookup in the accessed one or more data structures and identifying, as the selected at least one application feature, each application feature that is at least partially implemented by program code included in any of the identified at least one program code file;

based on the selected at least one application feature, selecting, from a plurality of regression test cases defined for the plurality of application features, regression test cases to be included in the automated regression testing; and commencing execution of the automated regression testing using the selected regression test cases.

14. The computer system of claim 13, wherein the identified at least one program code file comprises an identified plurality of program code files, wherein the selected at least one application feature comprises a selected plurality of application features, and wherein the method further comprises prioritizing the selected regression test cases into an order in which the automated regression testing is to execute the selected regression test cases, the prioritizing comprising at least one selected from the group consisting of:

(i) identifying which one or more program code files, of the identified plurality of program code files, includes program code at least partially implementing a greatest number of application features of any of the identified plurality of program code files, and prioritizing regression test cases, of the selected regression test cases, that regression test the application features at least partially implemented by program code included in the identified one or more program code files;

(ii) identifying, for each application feature of the selected plurality of application features, a number of program code files that include program code at least partially implementing that application feature, the number of program code files that include program code at least partially implementing that application feature being indicative of an amount of development resources, and prioritizing regression test cases, of the selected regression test cases, based on the amount of development resources for the selected plurality of application features; and (iii) prioritizing regression test cases, of the selected regression test cases, based on a respective priority assigned to each of the selected plurality of application features, the priority assigned to an application feature indicating priority in regression testing that application feature.

15. The computer system of claim 13, wherein the method further comprises:

updating the mappings between the program code files and the plurality of application features based on the changes changing which of the program code files implement which of the plurality of application features; and tracking changes in the mappings across stages of development of the application, and identifying, based on the changes in the mappings over time, technical debt informing of inefficiencies in development processes that develop and maintain the application.

16. The computer system of claim 13, wherein the selecting the regression test cases to be included in the automated regression testing comprises using a cognitive engine trained via machine learning and historical regression testing results to identify at least one selected from the group consisting of: (i) a regression test case, of the plurality of regression test cases, to include in the selected regression test cases, and (ii) a regression test case, initially proposed for inclusion in the selected regression test cases, to exclude from the selected regression test cases.

17. A computer program product comprising:

a computer readable storage medium readable by a processing circuit and storing instructions for execution by the processing circuit for performing a method comprising:

based on changes made to program code of an application, the program code of the application being included in program code files and implementing a plurality of application features of the application, automatically identifying at least one program code file, of the program code files, in which the changes are contained;

automatically selecting at least one application feature, of the plurality of application features, as at least one candidate on which to perform automated regression testing, the automatically selecting comprising:

electronically accessing one or more data structures comprising mappings between the program code files and the plurality of application features, the mappings indicating, for each program code file of the program code files, which of the plurality of application features are at least partially implemented by the program code included in that program code file;

performing a lookup in the accessed one or more data structures and identifying, as the selected at least one application feature, each application feature that is at least partially implemented by program code included in any of the identified at least one program code file;

based on the selected at least one application feature, selecting, from a plurality of regression test cases defined for the plurality of application features, regression test cases to be included in the automated regression testing; and commencing execution of the automated regression testing using the selected regression test cases.

18. The computer program product of claim 17, wherein the identified at least one program code file comprises an identified plurality of program code files, wherein the selected at least one application feature comprises a selected plurality of application features, and wherein the method further comprises prioritizing the selected regression test cases into an order in which the automated regression testing is to execute the selected regression test cases, the prioritizing comprising at least one selected from the group consisting of:

(i) identifying which one or more program code files, of the identified plurality of program code files, includes program code at least partially implementing a greatest number of application features of any of the identified plurality of program code files, and prioritizing regression test cases, of the selected regression test cases, that regression test the application features at least partially implemented by program code included in the identified one or more program code files;

(ii) identifying, for each application feature of the selected plurality of application features, a number of program code files that include program code at least partially implementing that application feature, the number of program code files that include program code at least partially implementing that application feature being indicative of an amount of development resources, and prioritizing regression test cases, of the selected regression test cases, based on the amount of development resources for the selected plurality of application features; and (iii) prioritizing regression test cases, of the selected regression test cases, based on a respective priority assigned to each of the selected plurality of application features, the priority assigned to an application feature indicating priority in regression testing that application feature.

19. The computer program product of claim 17, wherein the method further comprises:
    updating the mappings between the program code files and the plurality of application features based on the changes changing which of the program code files implement which of the plurality of application features; and
    tracking changes in the mappings across stages of development of the application, and identifying, based on the changes in the mappings over time, technical debt informing of inefficiencies in development processes that develop and maintain the application.

20. The computer program product of claim 17, wherein the selecting the regression test cases to be included in the automated regression testing comprises using a cognitive engine trained via machine learning and historical regression testing results to identify at least one selected from the group consisting of: (i) a regression test case, of the plurality of regression test cases, to include in the selected regression test cases, and (ii) a regression test case, initially proposed for inclusion in the selected regression test cases, to exclude from the selected regression test cases.

\* \* \* \* \*